UNITED STATES PATENT OFFICE.

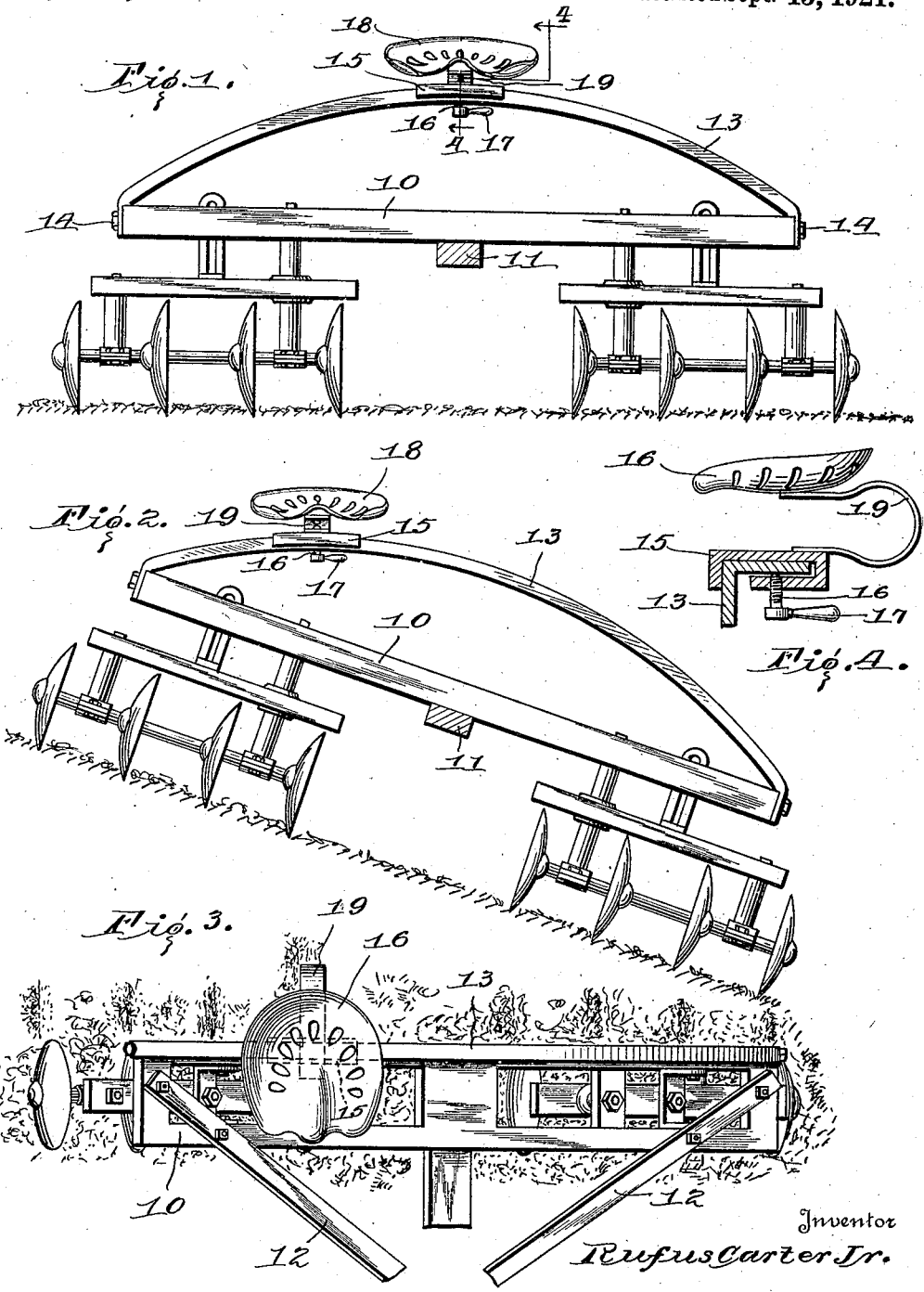

RUFUS CARTER, JR., OF DANVILLE, VIRGINIA.

VEHICLE-SEAT SUPPORT.

1,390,506.  Specification of Letters Patent.  Patented Sept. 13, 1921.

Application filed May 5, 1921. Serial No. 466,991.

*To all whom it may concern:*

Be it known that I, RUFUS CARTER, Jr., residing at Danville, county of Pittsylvania, State of Virginia, a citizen of the United States, have invented certain new and useful Improvements in Vehicle-Seat Supports, of which the following is a specification.

This invention relates to supports for harvester and implement seats and is particularly adapted for use upon harvesters or implements where the country is hilly and the consequent shifting of the weight of the driver from one side to the other causes a shifting of the center of gravity of the machine.

In using a vehicle, which has to travel on a side hill, such, for instance, as a disk harrow, it will be evident that the greatest efficiency will be obtained if the ground engaging members press into the ground with equal force. When, however, the vehicle reaches a side hill and one side is raised, the center of gravity is thrown to one side of the mid-point between the outer ground engaging elements. This causes more weight to be transferred to the ground engaging elements on the low side of the hill.

One of the objects of this invention is to provide an improved seat support which is mounted so as to be capable of moving about a center which is substantially at or below the center of gravity of the implement or harvester and which may be maintained in a level position regardless of the slope of the ground over which the implement or harvester is passing.

Another object is the provision of an improved seat support which is mounted so as to be capable of moving from side to side so that a variable pressure may be brought at different points, thus making it possible to shift the center of gravity so that it may remain over the mid-point between the outer ground engaging elements when the implement is on a side hill, or even farther up the hill if this is desirable.

An illustration of the application of my invention to attain the latter object is in the disk harrow where it might be necessary to shift the weight of the driver in order to cause more weight to be brought at one place than another due to the curvature of the disks and the slope of the ground.

Other and further objects of the invention will be apparent from the specification and claims.

Referring now to the drawing wherein preferred embodiments of my invention are illustrated, Figure 1 illustrates my improved seat support applied to a disk harrow, the same being on level ground.

Fig. 2 is a view similar to Fig. 1 but showing the seat shifted to accommodate the driver to the side hill over which the harrow is traveling.

Fig. 3 is a top plan view of the harrow in the position shown in Fig. 2.

Fig. 4 is a detail cross sectional view taken on the line 4—4 of Fig. 1.

Throughout the figures, the same reference characters refer to similar parts.

Referring particularly to Figs. 1 to 4, 10 designates the main frame of the vehicle which is here exemplified by the showing of a disk harrow. This main frame 10 is provided with a draft element 11 and suitable braces 12. Attached to the frame as at the outer ends is a bow-shaped support 13 which may be of any suitable cross section as an angle iron (see Fig. 4). This support 13 is secured to the frame as by the bolts 14. Slidably mounted on the support 13 is a slide 15 which is free to move lengthwise of the support and from side to side of the machine. The slide 15 is provided with a screw 16 having a handle 17 for holding the slide in any desired adjusted position. The seat 18 may be supported on the slide 15 as by the spring 19.

As the vehicle travels on the level as shown in Fig. 1, the seat is maintained in the position as shown. When a hill is reached, the vehicle assumes a position similar to that shown in Fig. 2. As the center of gravity in this figure would be thrown to the right, the seat 18 and slide 15 are adjusted to the left. This throws the center of gravity to the left and likewise at the same time levels the position of the seat to make it more comfortable for the driver. The shifting of the seat as shown has a tendency to bring the center of gravity of the whole vehicle over a point above the mid-point between the outer ground engaging elements and thus causes a more uniform pressure of the ground engaging elements upon or into the ground. When the desired adjustment is made, the screw 16 may be tightened by the handle 17 to hold the seat in place with relation to its support. If, however, the ground is changing often in slope, the screw 16 may be left slack and the driver by his feet, upon the frame, may cause the seat to maintain its proper position with relation to the horizontal.

In the claims, I have used the term "implement". This term is intended to cover harvesting machines, tilling machines and all other machines or implements used in the preparation of the ground for crops or in gathering the crops after they are grown.

While, I have shown and described in detail, preferred embodiments of my invention, I desire to have it understood that I do not limit myself to the exact structure shown and described and that modifications and changes may be made without departing from the spirit of my invention and within the scope of the appended claims.

Having described my invention what I claim is:—

1. In combination, an implement having a frame and ground engaging members, an upwardly bow-shaped support affixed to the frame and extending transversely thereof substantially the width of the implement and a seat slidably supported on the bow-shaped support.

2. In combination, an implement having a frame and ground engaging members, an upwardly bow-shaped support affixed to the frame and extending transversely thereof and a seat slidably supported on the bow-shaped support, the center of the bow being below the level of the ground whereby when the center of gravity is thrown to one side of the axis of the path of travel by a side hill, the driver's weight may be shifted with the seat to the other side of the implement and still remain in a substantially correct position.

In testimony whereof I hereunto affix my signature.

RUFUS CARTER, Jr.